United States Patent Office 3,271,166
Patented Sept. 6, 1966

3,271,166
COOKING FAT COMPOSITION
Geert Jan Van Leeuwen, Capelle aan den Ijssel, Aart Mijnders, Vlaardingen, and Gerhardus Wilhelmus Boot, Barendrecht, Netherlands, assignors to Lever Brothers Company, New York, N.Y., a corporation of Maine
No Drawing. Filed Aug. 5, 1963, Ser. No. 300,097
Claims priority, application Great Britain, Aug. 10, 1962, 30,765/62
7 Claims. (Cl. 99—118)

This invention relates to a new fatty composition for frying, roasting, baking, gravy making and the like, not containing a water phase, as well as to a method for preparing such a composition.

The principal object of the invention is to provide a composition containing a high proportion of fat, which composition, besides having the good properties of margarine as regards taste and consistency, contains no aqueous phase and is in consequence non-spattering and is particularly suitable for frying as it forms an attractive brown sediment which is finely divided and does not stick to the bottom of the frying pan. Up to now it has been very difficult to provide fatty compositions for frying purposes having no water phase and giving a brown sediment of the above quality.

It has now been found that a substantially water-free composition, being composed for the most part of an edible fat and containing whey powder dispersed therein, is very suitable for use as a cooking fat, and provides all the desired properties, mentioned above. The amount of whey powder may vary between about 0.2% and about 8% by weight of the composition, amounts from 0.8 to 2% of the weight of the composition being preferred.

Preferably a mixture of whey powder and milk powder is used. The weight ratio of whey powder to milk powder may with advantage be between 3:1 and 5:1, preferably 4:1, but higher or lower ratios are also useful.

The fatty compositions according to the present invention are also suitable for making cookies, cakes and other bakery products, in order to impart an attractive brown colour to these products.

The amount of the mixture of whey powder and milk powder is preferably about 1% by weight of the composition, but larger or smaller amounts may also be used.

Preferably a fat blend is used of such consistency as to give good spreadability and this property may also be improved by aeration of the composition with a suitable gas, preferably nitrogen.

The compositions of the invention, which may closely resemble margarine as regards appearance and consistency, provide the following advantages:

(i) Less time to reach the baking, frying or roasting temperature is required;
(ii) Baking and frying are now possible at higher temperatures;
(iii) A more attractive gravy is obtained without the danger of its acquiring a burnt appearance.

The fat or fat blend can be mixed with the other ingredients in a premix tank and subsequently brought by means of a pump, into the A-unit of a votator from which it may pass on to a votator B-unit. After this the composition can be worked up by one of the known methods.

When an aerated composition is required the addition of a gas, preferably nitrogen, to the fatty composition may be made between the premix tank and the pump which conducts the composition to the A-unit, or the gas may be added under pressure between this pump and the votator. A further alternative is the addition of the gas under pressure after the votator B-unit. The proportion of gas preferably amounts to 10 to 50%, particularly 30%, of the volume of the product but this percentage may also be higher or lower.

It is of advantage to incorporate salt in the composition, but, owing to the absence of an aqueous phase in which the salt could be dissolved (as in margarine), this demands a special method of incorporation. It is very difficult to distribute free salt throughout a fat phase. Moreover the salt grains cannot be kept in suspension in the premixer. Salt grains applied in the free form produce an undesirable sensation in the mouth. Also, free salt grains owing to their hardness would damage the equipment for working up such a composition. Although some improvement can be obtained by milling and sieving of the salt such operations add considerably to the cost of the process without wholly satisfactory results. In the conventional margarine manufacture these difficulties do not arise, since the salt is dissolved in the water phase together with other components and this aqueous solution is homogeneously distributed through the fatty phase.

The invention, however, provides a method for preparing a composition containing salt in addition to whey powder, and optionally milk powder, in which the above-mentioned difficulties are avoided. According to this method an aqueous slurry containing whey powder, salt, and optionally milk powder is dried, preferably spray-dried, to form a homogeneous product of grains having dimensions not exceeding 60 microns, preferably between 50 and 60 microns, consisting of whey powder, salt and optionally milk powder. This dried product can be worked up in a premix tank with fat in order to obtain a uniform suspension, and as the grains are very small and relatively soft, no damage will be caused to the equipment, and in the final product salt grains cannot be detected in the mouth. A slurry to be spray-dried preferably contains 35–40% of dry matter and is preferably atomised by a rotating disc having a speed of about 16,000 r.p.m., the temperature of the inlet-air being about 170° C. and the temperature of the outlet-air about 70° C.

The spray-dried powder obtained has a moisture content of less than 2% by weight. This spray-dried product is added carefully and slowly to a molten fat, which is tempered at a temperature at which the fat or fat blend is liquid.

Examples of the fatty composition according to the invention are given below. Unless otherwise stated all the percentages are by weight.

| | Example 1 | Example 2 | Example 3 | Example 4 |
|---|---|---|---|---|
| | Percent | Percent | Percent | Percent |
| Fat | 97.6 | 96.6 | 96.6 | 97.6 |
| Mixture of equal parts of whey powder and milk powder | 1 | 2 | 1 | 2 |
| Salt | 1 | 1 | 2 | |
| Lecithin | 0.4 | 0.4 | 0.4 | 0.4 |
| Gas: about 30% by volume. | | | | |

The fat was a blend of the following composition:

| | Percent |
|---|---|
| Groundnut oil | 20 |
| Palm oil | 30 |
| Coconut oil | 10 |
| Whale oil, hardened to a slip-melting point of 37° C. | 40 |

Small proportions of colouring matter and flavouring agents can be incorporated as required.

*Examples 5 to 8*

These corresponded to Examples 1 to 4 respectively except that the ratio of whey powder to milk powder was 4:1.

Examples 9 to 12

These corresponded to Examples 1 to 4 respectively except that the mixture of whey powder and milk powder was replaced by an equal weight of whey powder alone.

The following example illustrates the preparation of a fatty composition according to the invention:

Example 13

In making a composition as specified in Example 1 a spray-dried powder containing the whey powder, milk powder and salt was made as described above from an aqueous slurry of these constitutents.

The fat was charged into a stirred premixing tank held at a temperature of 40 to 50° C. (at which the fat was completely liquid).

With constant stirring the spray-dried powder was run slowly into the hot fat.

The mixture was pumped under a pressure of 300 lbs./sq. inch into the A-unit of a votator chilled to −10 to −17° C. and then in turn through the B-unit of a votator, through a texturating valve where the pressure fell to 60 lbs./sq. inch, through a mixer and then to a packaging machine.

Between the texturating valve and the mixer nitrogen was introduced under pressure so that the composition entering the mixer contained 30% of its volume of nitrogen.

In the mixer the gas was uniformly dispersed throughout the composition.

The mixer was of the kind described in British Patent No. 646,591.

At the packaging machine the composition, still in semi-liquid form, was filled into previously folded wrappers in which it set on standing.

As indicated above, instead of introducing the gas between the texturating valve and the mixer it may be introduced at an earlier stage, for instance between the premixing tank and the pump that forwards the composition to the votator or between that pump and the votator.

What is claimed is:

1. A substantially water-free composition suitable for use as a cooking fat, said composition being composed substantially of an edible fat containing dispersed therein 0.2 to 8% of whey powder and 0 to $n$ percent of milk powder, where $n$ is not more than 2% of the composition and not more than the proportion of whey therein, all these percentages being based on the weight of the composition, no other non-fat milk solids being present.

2. A substantially water-free composition suitable for use as cooking fat, said composition being composed substantially of an edible fat containing dispersed therein 0.8 to 2% of whey powder based on the weight of the composition and 0 to 50% of milk powder based on the weight of whey powder, no other non-fat milk solids being present.

3. A composition according to claim 2, in which the ratio of whey powder to milk powder is between 3:1 and 5:1 by weight.

4. A composition according to claim 2, in which is dispersed 1 to 2% of its weight of finely divided salt.

5. A composition according to claim 2, in which is dispersed 1 to 2% of its weight of finely divided salt and in which the salt and other dispersed material is present in the form of particles of a spray dried slurry containing all the dispersed materials, said particles being 50 to 60 microns in diameter.

6. A substantially water-free composition suitable for use as a cooking fat consisting essentially of an edible fat, 1% whey powder, 1% milk powder, and from 1 to 2% salt, the percentages being by weight of the total composition.

7. A method for preparing a composition claimed in claim 5, wherein an aqueous slurry containing the solid non-fat components to be dispersed in the fat is spray dried to form a powder, the powder is added to the molten fat, and the mixture is then subjected to conventional votator processing.

References Cited by the Examiner

UNITED STATES PATENTS

| | | | |
|---|---|---|---|
| 985,271 | 2/1911 | Merrill | 99—203 |
| 995,777 | 6/1911 | Filbert | 99—123 |
| 1,444,562 | 2/1923 | Sherman | 99—123 |
| 1,583,294 | 5/1926 | Kohman | 99—123 |
| 2,035,899 | 3/1936 | Kraft | 99—123 |

A. LOUIS MONACELL, *Primary Examiner.*

M. W. GREENSTEIN, *Assistant Examiner.*